US009716744B2

(12) United States Patent
Zhu et al.

(10) Patent No.: US 9,716,744 B2
(45) Date of Patent: Jul. 25, 2017

(54) REMOTE ACCESS FROM MOBILE DEVICES

(75) Inventors: Rui Zhu, Redmond, WA (US); Wissam Kazan, Bellevue, WA (US); Keping Zhao, Redmond, WA (US); Michael Thomas, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/282,472

(22) Filed: Oct. 27, 2011

(65) Prior Publication Data

US 2013/0110979 A1    May 2, 2013

(51) Int. Cl.
*G06F 15/16* (2006.01)
*H04L 29/08* (2006.01)
*G06F 17/30* (2006.01)

(52) U.S. Cl.
CPC ........ *H04L 67/06* (2013.01); *G06F 17/30174* (2013.01); *H04L 67/1095* (2013.01); *H04L 67/04* (2013.01)

(58) Field of Classification Search
CPC .... G06Q 10/107; G06Q 30/02; H04L 12/585; H04L 12/58; H04L 12/581; H04L 12/5855; H04L 29/08072; H04L 29/06; H04L 29/0809; H04L 29/08117
USPC .......................................... 715/733; 709/206
See application file for complete search history.

(56) References Cited

U.S. PATENT DOCUMENTS

| 6,052,735 | A | 4/2000 | Ulrich et al. |
| 6,789,126 | B1* | 9/2004 | Saulpaugh et al. ........... 709/245 |
| 6,941,270 | B1* | 9/2005 | Hannula .............. G06Q 20/027 |
| | | | 705/500 |
| 7,949,301 | B2 | 5/2011 | Bells et al. |
| 2003/0003994 | A1* | 1/2003 | Washio .................... A63F 13/10 |
| | | | 463/40 |
| 2003/0097451 | A1* | 5/2003 | Bjorksten ............... G06F 21/10 |
| | | | 709/228 |
| 2003/0105812 | A1* | 6/2003 | Flowers, Jr. .......... H04L 63/029 |
| | | | 709/203 |
| 2004/0128198 | A1* | 7/2004 | Register et al. ................ 705/14 |
| 2004/0235521 | A1* | 11/2004 | Pradhan ............ H04M 1/72522 |
| | | | 455/558 |
| 2004/0250130 | A1 | 12/2004 | Billharz et al. |

(Continued)

FOREIGN PATENT DOCUMENTS

CN       1804836 A       7/2006
CN       101072397 A     11/2007

(Continued)

OTHER PUBLICATIONS

US 8,983,432, 03/2015, Schell et al. (withdrawn)*

(Continued)

*Primary Examiner* — Mahran Abu Roumi
(74) *Attorney, Agent, or Firm* — Alleman Hall Creasman & Tuttle LLP

(57) ABSTRACT

In one embodiment, a mobile device 102 may execute a mobile client 104 to access a remote client 108 on a remote computer device 110. A mobile client 104 may connect to a data network 106. The mobile client 104 may establish a peer-to-peer connection with a remote client 108 executing on a remote computer device 110 over the data network 106.

20 Claims, 7 Drawing Sheets

(56) References Cited

U.S. PATENT DOCUMENTS

| | | | |
|---|---|---|---|
| 2005/0185636 A1 | 8/2005 | Bucher | |
| 2005/0256909 A1 | 11/2005 | Aboulhosn et al. | |
| 2006/0161516 A1* | 7/2006 | Clarke | G06F 17/30578 |
| 2006/0265467 A1* | 11/2006 | Jang | 709/216 |
| 2007/0168439 A1* | 7/2007 | Koch | G06F 17/30091 709/206 |
| 2007/0192686 A1* | 8/2007 | Fortes | G06F 17/211 715/244 |
| 2008/0228854 A1* | 9/2008 | Grimault et al. | 709/201 |
| 2008/0244415 A1 | 10/2008 | Shim | |
| 2009/0006972 A1* | 1/2009 | Karlson et al. | 715/737 |
| 2009/0019134 A1 | 1/2009 | Bellifemine et al. | |
| 2009/0030976 A1* | 1/2009 | Shukla | H04L 65/4015 709/203 |
| 2009/0040947 A1* | 2/2009 | Krivopaltsev | H04L 41/0213 370/255 |
| 2009/0172547 A1* | 7/2009 | Sparr | 715/730 |
| 2009/0203402 A1 | 8/2009 | Aftab et al. | |
| 2009/0319904 A1* | 12/2009 | Rensin | H04L 29/06027 715/733 |
| 2010/0262582 A1 | 10/2010 | Garcia-Ascanio et al. | |
| 2010/0312705 A1* | 12/2010 | Caruso et al. | 705/45 |
| 2011/0028145 A1 | 2/2011 | Marsyla et al. | |
| 2011/0099218 A1* | 4/2011 | Schwartz | H04N 7/24 709/201 |
| 2011/0138049 A1 | 6/2011 | Dawson et al. | |
| 2011/0251892 A1* | 10/2011 | Laracey | G06Q 30/0253 705/14.51 |
| 2012/0198032 A1* | 8/2012 | Fitzgerald | H04W 4/00 709/219 |
| 2014/0149293 A1* | 5/2014 | Laracey | G06Q 20/108 705/44 |

FOREIGN PATENT DOCUMENTS

| | | |
|---|---|---|
| EP | 1881421 A1 | 1/2008 |
| EP | 2273435 A1 | 1/2011 |
| JP | 2008289133 A | 11/2008 |
| WO | 03014955 A1 | 2/2003 |

OTHER PUBLICATIONS

Peer-to-Peer (Windows), Microsoft.com (attached).*
Kelenyi, et al., "CloudTorrent—Energy-Efficient BitTorrent Content Sharing for Mobile Devices via Cloud Services", Retrieved at <<http://ieeexplore.ieee.org/stamp/stamp.jsp?tp=&arnumber=5421712>>, Proceedings of the 7th IEEE Consumer Communications and Networking Conference (CCNC), Jan. 9-12, 2010, pp. 2.
Oh, Damien "How to Access Your Computer Files (and Stream Music) From Your Mobile Devices", Retrieved at <<http://maketecheasier.com/access-computer-files-music-from-mobile-devices/2010/06/23>>, Published Date: Jun. 23, 2010, pp. 6.
"International Search Report", Mail Date: Mar. 11, 2013, Application No. PCT/US2012/061751, Filed date: Oct. 24, 2012, pp. 13.
"Search Report Issued in European Patent Application No. 12843163.2", Apr. 23, 2015, 8 Pages.
"Office Action Issued in European Patent Application No. 12843163.2", Mailed Date: Apr. 19, 2016, 8 Pages.
"First Office Action and Search Report Issued in Chinese Patent Application No. 201280052607.3", Mailed Date: May 5, 2016, 13 Pages.
"Office Action Issued in Japanese Patent Application No. 2014-538964", Mailed Date: Sep. 20, 2016, 7 Pages.
"Second Office Action Issues in Chinese Patent Application No. 201280052607.3", Mailed Date: Dec. 19, 2016, 10 Pages.
"Office Action Issued in Japanese Patent Application No. 2014-538964", Mailed Date: Feb. 7, 2017, 3 Pages. (W/o English Translation).

* cited by examiner

800

REMOTE ACCESS FROM MOBILE DEVICES

BACKGROUND

A personal computer may store one or more data files in a data storage device. A user may connect a mobile computer device, such as a smart phone, to the personal computer to transfer the data files to the mobile computer device. The mobile computer device may be connected to the personal computer using a universal serial bus (USB) cable.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a mobile device executing a mobile client to access a remote client on a remote computer device. A mobile client may connect to a data network. The mobile client may establish a peer-to-peer connection with a remote client executing on a remote computer device over the data network.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
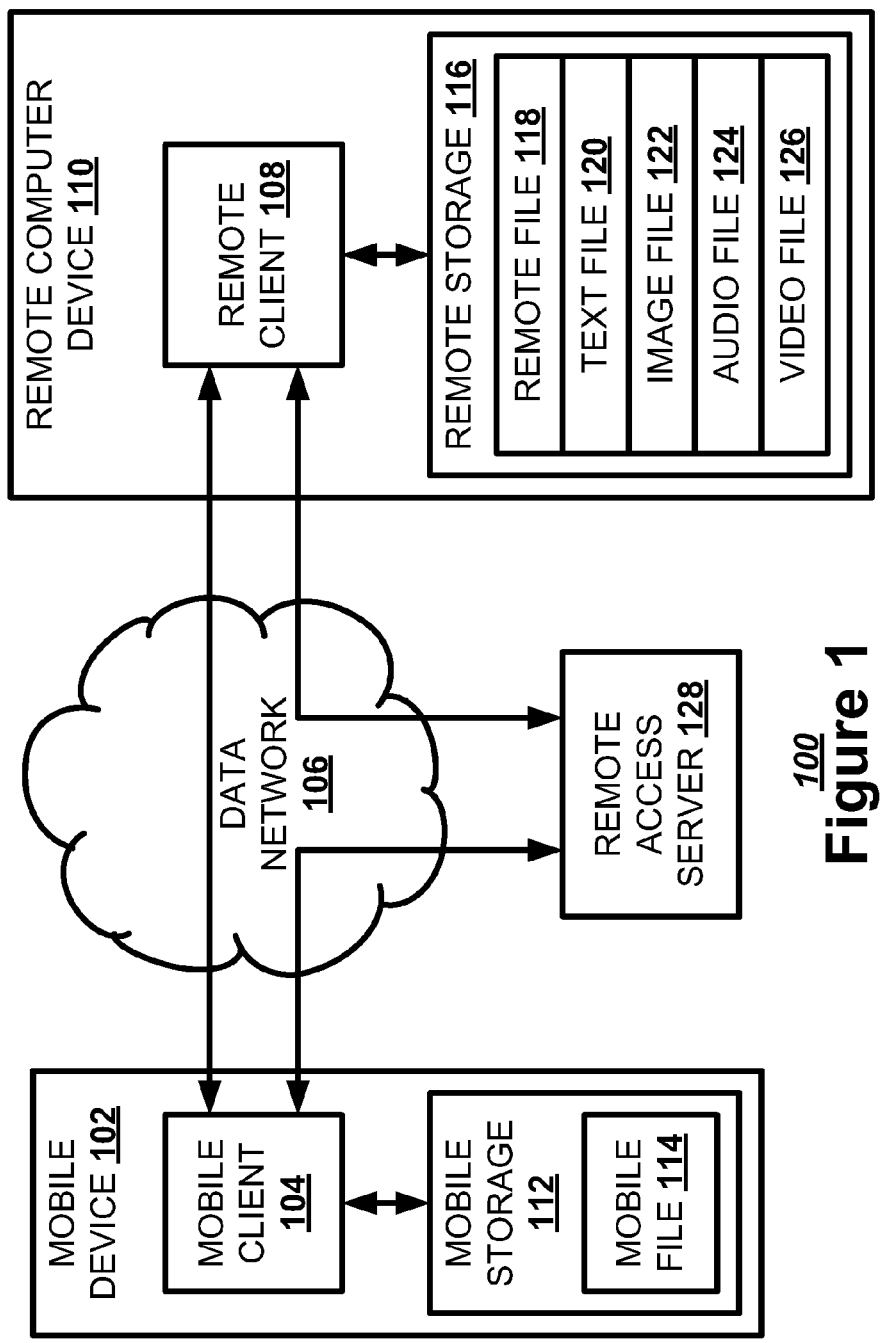
FIG. 1 illustrates, in a block diagram, one embodiment of a network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The implementations may be a machine-implemented method, a tangible machine-readable medium having a set of instructions detailing a method stored thereon for at least one processor, or a mobile device.

A user may access a file on a remote computer device from any mobile device. The user may browse folders, view or edit documents, browse photos, and play video data or audio data. The user may install the mobile client on a mobile device, allowing access from anytime or anyplace. The user may avoid copying folders or files to an external disk or laptop by using a mobile device to go back to the remote computer device without being physically present.

The mobile client may access a remote client on a remote computer device using a direct connection, such as a peer-to-peer connection. A direct connection is a connection between the remote client and the mobile client without an intervening server to manage the file actions or file management actions. A peer-to-peer connection is a nodal connection between two or more devices with each node having an equal status and privilege in the connection, as opposed to a client-server relationship. A remote access server may be responsible for the initial connection establishment between a mobile client and a remote computer device. After that initial connection, the mobile client may talk directly to the remote computer device, including sending requests and receiving responses. For those mobile devices not capable of performing peer-to-peer connections, the remote access server may take the role of keeping the connection with the remote computer device to transfer data.

The connection system may have a mobile client, a cloud service and a remote client executing on a remote computer device. For example, a user may browse a picture library on a home personal computer. When the user selects the home personal computer from the list of devices associated through the user interface of the mobile client, the mobile client may send a connection establishment request to a remote access server. The remote access server may receive the request, authenticate the user, and check the peer-to-peer connection capability of the remote computing device and the mobile device. If the mobile device is an appropriate device for peer-to-peer connections, the remote access server may then query the remote computer device. The remote access server may determine the online presence of the remote computer device and the peer-to-peer connection capability. If the remote computer device may establish a peer-to-peer connection, the remote computer device may respond with connection data, such as an internet protocol address. The remote access server may forward the connection data back to the mobile client. The mobile client may establish a peer-to-peer connection with the remote computer device.

The mobile client may then communicate directly with the remote computer device. For example, the mobile client may send a view picture library request to the remote computer device. The remote computer device may receive the request and pull the metadata from the local picture library. The remote computer device may send the metadata back to the mobile device. The mobile client may view the picture library as if the user is viewing the picture library directly with a file manager on the remote computer device. When a user further clicks to view a particular photo, the mobile client may send a view image request to the remote computer device. The remote computer device may respond to the request from the mobile device by resizing the image and sending the resized image to the mobile client for display on a mobile screen.

Thus, in one embodiment, a mobile device may execute a mobile client to access a remote client on a remote computer device. A mobile client may connect to a data network. The mobile client may establish a peer-to-peer connection with a remote client executing on a remote computer device over the data network.

FIG. 1 illustrates, in a block diagram, one embodiment of a network 100. A mobile device 102 may execute a mobile client 104 that creates a peer-to-peer connection across a data network 106 to a remote client 108 being executed by a remote computer device 110. The mobile client 104 may have access to a mobile storage device 112 of the mobile device 102 storing a mobile file 114. The mobile file 114 is any file stored on the mobile device 102.

The remote client 108 may provide access to a remote storage device 116 of the remote computer device 110 storing a remote file 118. The remote file 118 is any file stored on the remote computer device 110. The remote file 118 may be a media data file, such as a text file 120, a digital image file 122, an audio file 124, a video file 126, or other type of data file.

The mobile client 104 may use a remote access server 128 to create the peer-to-peer connection with the remote client 108. The remote access server 128 may receive a peer-to-peer connection query from the mobile client 104 specifying the remote client 108 and describing the mobile device 102. A peer-to-peer connection query seeks out the availability of the remote computer device 110 for a peer-to-peer connection and the proper formatting for a peer-to-peer connection request. A peer-to-peer connection request initiates establishing the peer-to-peer connection. The remote access server 128 may send a peer-to-peer connection query to the remote client 108 to determine the capabilities and connection data of the remote computer device 110. If the remote computer device 110 supports peer-to-peer communication, the remote access server 128 may wrap the peer-to-peer connection query in the proper connection data for the remote client and return that peer-to-peer connection query to the mobile client 104. The mobile client 104 may then send a peer-to-peer connection request to the remote client 108 to establish the peer-to-peer connection. The remote client 108 may authenticate the mobile client 104 based on the peer-to-peer connection request. The mobile client 104 may authenticate the mobile client 104 to the remote client 108.

Once the mobile client 104 has been authenticated, the mobile client 104 may designate other mobile devices as being permitted to access the remote computer device. The user may use the remote computer device 110 or a primary mobile device 102 to designate a set of permission levels for other mobile devices. A permission level describes what types of file actions or file management actions that mobile device may take with a file. The user may designate certain files as accessible and other files as prohibited to a mobile device. A permission level may be applied on a file by file basis or to various classes or groups of files.

Once the peer-to-peer connection between the mobile client 104 and the remote client 108 has been established, the mobile client 104 may store copies of the mobile file 114 on the remote computer device 110. The mobile client 104 may access a remote file 118 stored on the remote computer device 110. The mobile client 104 may execute a download action on the remote file 118, creating a mobile copy of the remote file 118 on the mobile device 102. The remote client 108 may resize the mobile copy of the remote file 118 for use by the mobile device 102, based on the mobile device specification for the mobile device 102. The remote client may receive the mobile device specification from the mobile device 102 or an outside source or may have previously stored the mobile device specification. The mobile client 104 may execute an edit action on the remote file 118, directly changing the remote file 118 on the remote computer device 110.

The remote file 118 may be a sequential media file. A sequential media file is any media file that presents media that may be played sequentially, such as an audio file 124 or a video file 126. The remote client 108 may stream a sequential media file to the mobile client 104.

The mobile client 104 may execute a file management action on the file structure of the remote computer device 110. A file management action may be a create action, a delete action, a move action or a remote copy action. A create action creates a remote file 118 in the remote computer device 110. A delete action removes a remote file 118 from the remote computer device 110. A move action moves a remote file 118 from a first folder to a second folder in the remote computer device 110. A remote copy action creates a copy of the remote file 118 in the remote computer device 110.

A file may exist as a mobile copy 114 in the mobile device 102 and a remote copy 118 on the remote computer device 110. The mobile client 104 or the remote client 108 may synchronize the mobile file 114 with the remote file 118 according to a synchronization schedule throughout the life of the peer-to-peer connection. If the mobile file 114 differs from the remote file 118, the mobile client 104 may perform a conflict resolution action between the remote file 118 and the mobile file 114. A conflict resolution action determines which version the remote file 118 and the mobile file 114 may reflect.

Figure 2:
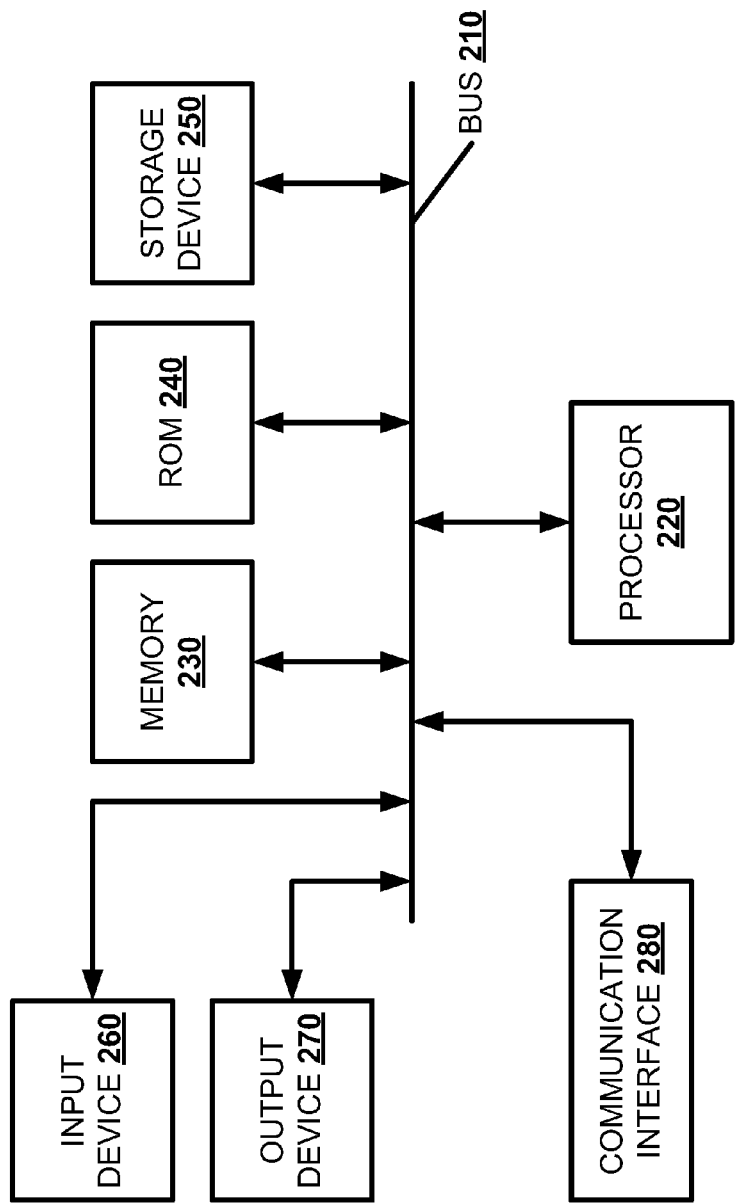
FIG. 2 illustrates, in a block diagram, one embodiment of a computing device.

FIG. 2 illustrates a block diagram of an exemplary computing device 200 which may act as a mobile device 102, a remote computer device 110, or a remote access server 128. The computing device 200 may combine one or more of hardware, software, firmware, and system-on-a-chip technology to implement the mobile client 104 or the remote client 108. The computing device 200 may include a bus 210, a processor 220, a memory 230, a read only memory (ROM) 240, a storage device 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. The storage device 250 may store a set of instructions detailing a method that when executed by one or more processors cause the one or more processors to perform the method. The storage device 250 may also be a database or a database interface for storing data files or peer-to-peer data connection data.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables processing device 200 to communicate with other devices or networks. The communication interface 280 may include a network interface or a mobile transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

Figure 3:
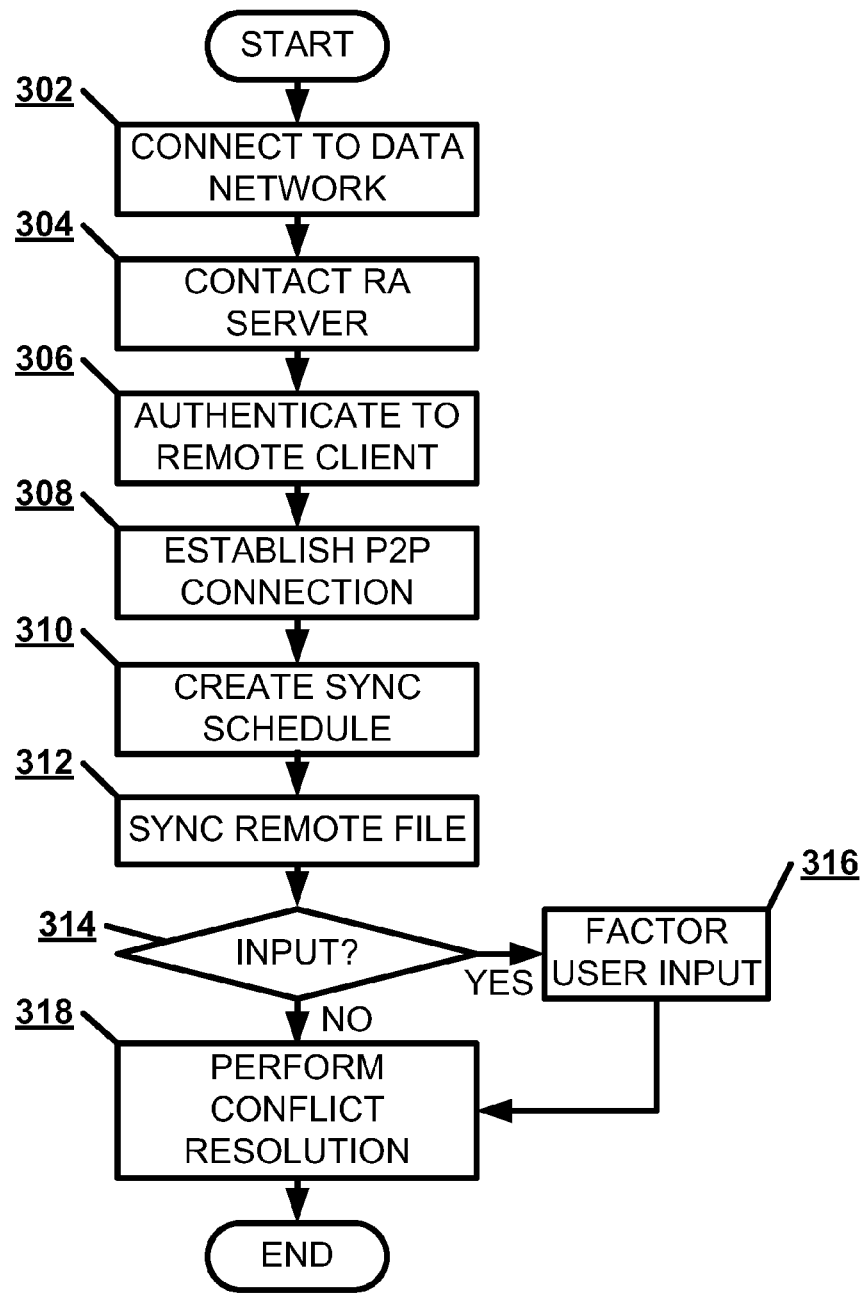
FIG. 3 illustrates, in a flowchart, one embodiment of a method for establishing a peer-to-peer connection from a mobile client to synchronize files.

FIG. 3 illustrates, in a flowchart, one embodiment of a method 300 for establishing a peer-to-peer connection from a mobile client 104 to synchronize files. The mobile client 104 executing on a mobile device 102 may connect to a data network 106 (Block 302). The mobile client 104 may contact a remote access (RA) server 128 to establish a peer-to-peer (P2P) connection (Block 304). The mobile client 104 may authenticate itself to the remote client 108 (Block 306). The mobile client 104 may establish a peer-to-peer connection with a remote client 108 executing on a remote computer device 110 over the data network 106 (Block 308). The mobile client 104 may create a synchronization schedule with the remote client 108 (Block 310). The mobile client 104 may synchronize a remote file 118 on the remote computer device 110 with a mobile file 114 on the mobile device 102 (Block 312). If the versions of the mobile file 114 and the remote file 118 conflict and a user input has been received (Block 314), the mobile client 104 may factor the user input into a conflict resolution action (Block 316). The mobile client 104 may perform the conflict resolution action between the remote file 118 and the mobile file 114 (Block 318).

Figure 4:
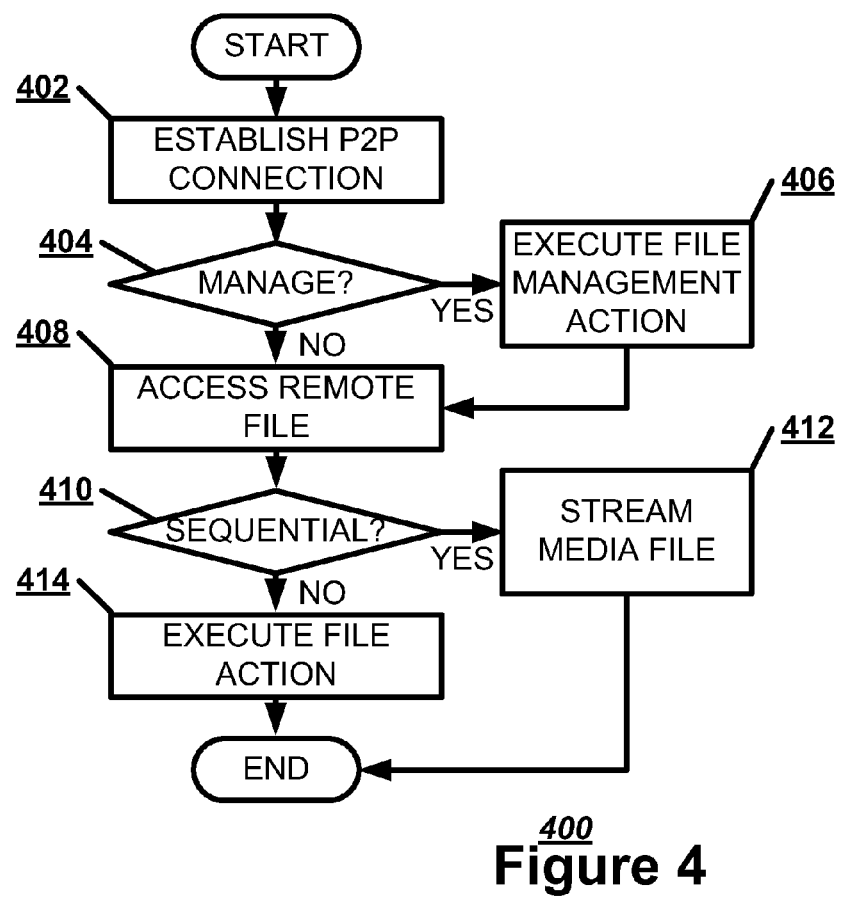
FIG. 4 illustrates, in a flowchart, one embodiment of a method for establishing a peer-to-peer connection from a mobile client to access a remote file.

FIG. 4 illustrates, in a flowchart, one embodiment of a method 400 for establishing a peer-to-peer connection from a mobile client 104 to access a remote file 118. The mobile client 104 may establish a peer-to-peer connection with a remote client 108 executing on a remote computer device 110 over the data network 106 (Block 402). If the mobile client 104 is performing a file management action (Block 404), the mobile client 104 may execute a file management action on the remote computer device 110 (Block 406). The file management action may be at least one of a create action, a delete action, a move action, or a remote copy action on a remote file 118 of the remote computer device 110. The mobile client 104 may access a remote file 118 on the remote computer device 110 (Block 408). If a remote file 118 is a remote sequential media file, such as an audio file 124 or a video file 126 (Block 410), the mobile client 104 may stream the remote sequential media file on the remote computer device 110 to the mobile client 104 (Block 412). Otherwise, the mobile client 104 may execute a file action on the remote file 118 of the remote computer device 110 (Block 414). The file action may be at least one of an edit action or a download action.

Figure 5:
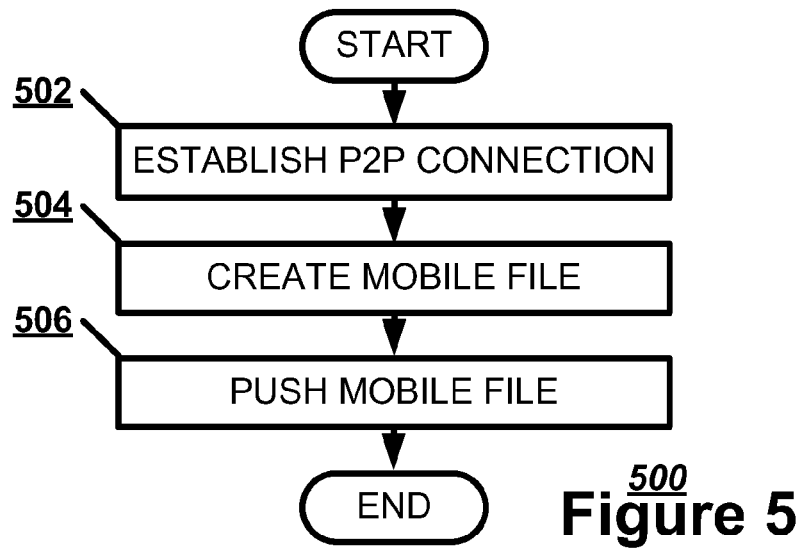
FIG. 5 illustrates, in a flowchart, one embodiment of a method for using a mobile client to store a mobile file.

FIG. 5 illustrates, in a flowchart, one embodiment of a method 500 for establishing a peer-to-peer connection from a mobile client 104 to store a mobile file 114. The mobile client 104 may establish a direct connection, such as a peer-to-peer connection, with a remote client 108 executing on a remote computer device 110 over the data network 106 (Block 502). The mobile client 104 may create a mobile file 114 on the mobile device 102 (Block 504). The mobile client 104 may push the mobile file 114 to remote client 108 (Block 506). A push action is a file transmission from the mobile device 102 to the remote computer device 110 initiated by the mobile client 104.

Figure 6:
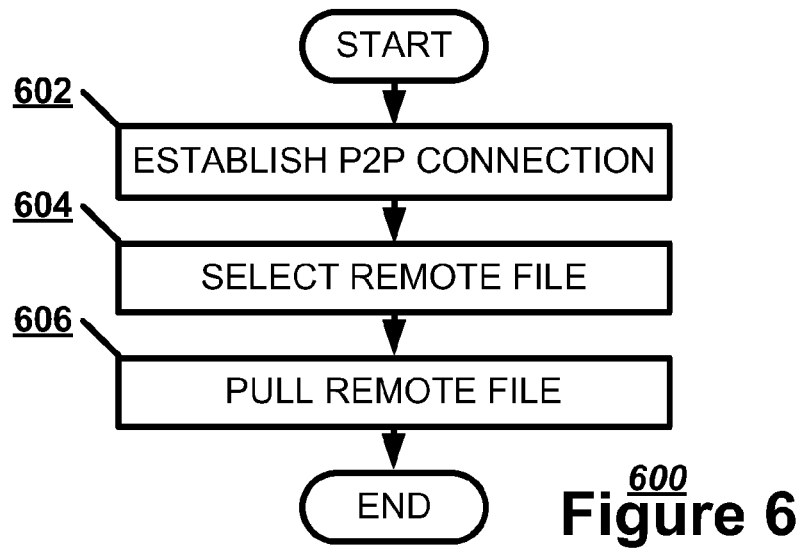
FIG. 6 illustrates, in a flowchart, one embodiment of a method for using a mobile client to retrieve a remote file.

FIG. 6 illustrates, in a flowchart, one embodiment of a method 500 for establishing a peer-to-peer connection from a mobile client 104 to retrieve a remote file 118. The mobile client 104 may establish a direct connection, such as a peer-to-peer connection, with a remote client 108 executing on a remote computer device 110 over the data network 106 (Block 602). The mobile client 104 may select a remote file 118 in the remote storage device 116 (Block 604). The mobile client 104 may pull the remote file 118 from the remote client 108 (Block 606). A pull action is a file transmission from the remote computer device 110 to the mobile device 102 initiated by the mobile client 104.

Figure 7:
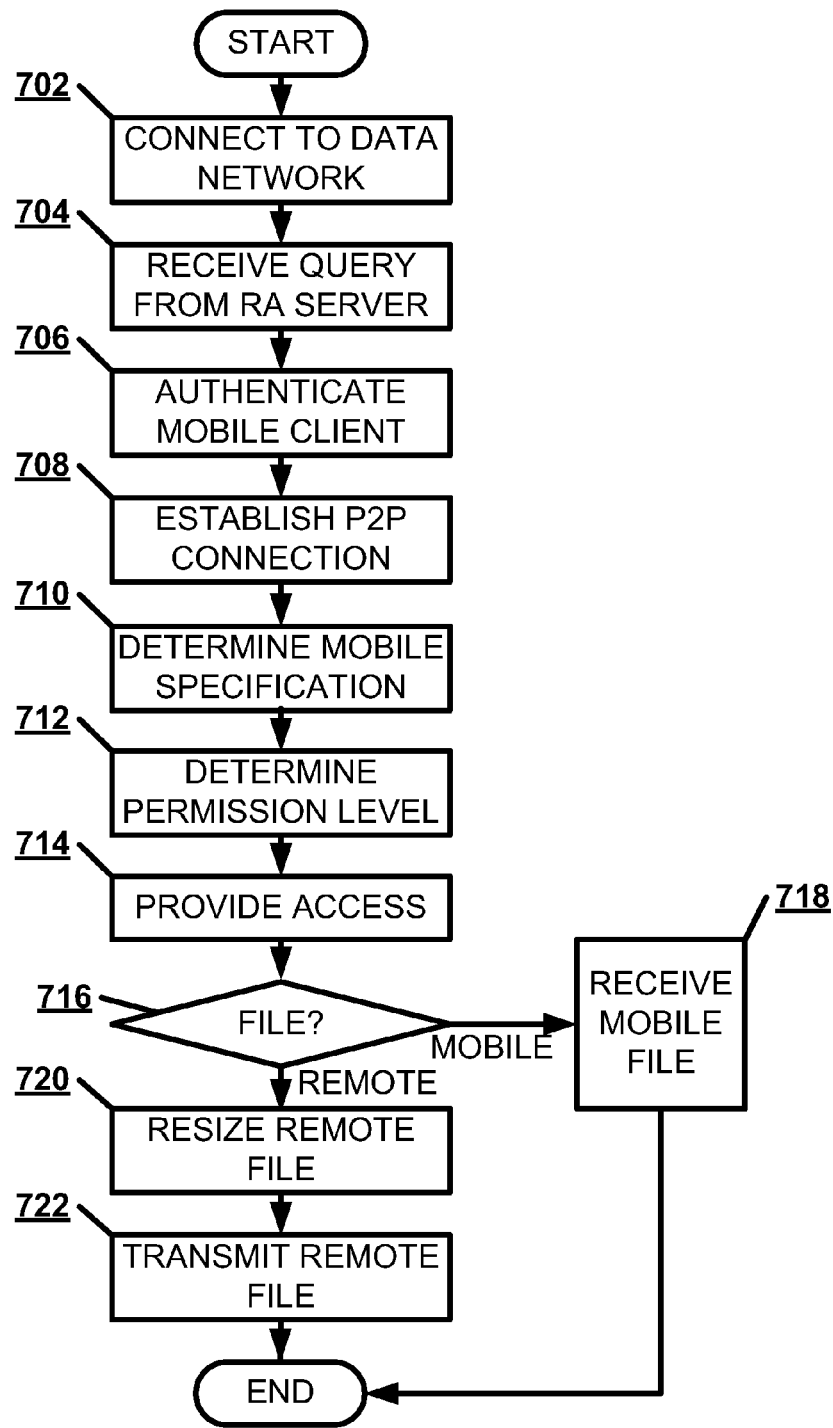
FIG. 7 illustrates, in a flowchart, one embodiment of a method for establishing a peer-to-peer connection with a remote client.

FIG. 7 illustrates, in a flowchart, one embodiment of a method 700 for establishing a peer-to-peer connection with a remote client 108. The remote client 108 executing on a remote computer device 110 may connect to a data network 106 (Block 702). The remote client 108 may receive a peer-to-peer connection query from a remote access server 128 on behalf of the mobile client 104 (Block 704). The remote client 108 may authenticate the mobile client 104 (Block 706). The remote client 108 may establish a peer-to-peer connection with a mobile client 104 executing on a mobile device 102 over the data network 106 (Block 708). The remote client 108 may determine a mobile device specification for the mobile device 102 (Block 710). The remote client 108 may determine a permission level for the mobile device 102 (Block 712). The remote client 108 may provide access to a remote file 118 on the remote computer device 110 to the mobile client 104 (Block 714). If the file action the user is performing is for a mobile file 114 (Block 716), the remote client 108 may receive a mobile file 114 from the mobile client 104 (Block 718). If the file action the user is performing is for a remote file 118 (Block 716), the remote client 108 may resize the remote file 118 for presentation by the mobile client 104 (Block 720). The remote client 108 may transmit the remote file 118 to the mobile client 104 (Block 722).

Figure 8:
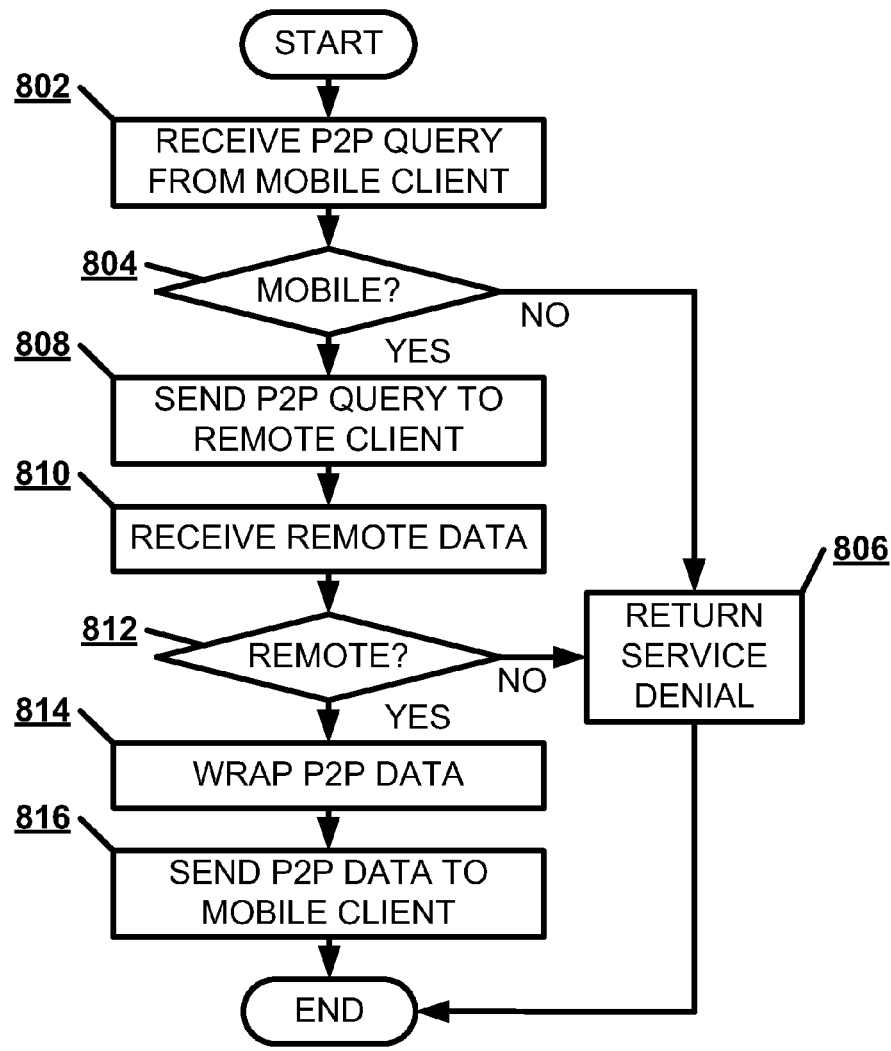
FIG. 8 illustrates, in a flowchart, one embodiment of a method for establishing a peer-to-peer connection using a remote access server.

FIG. 8 illustrates, in a flowchart, one embodiment of a method 800 for establishing a peer-to-peer connection using a remote access server 128. The remote access server 128 may receive a peer-to-peer connection query from a mobile client 104 (Block 802). If the mobile client 104 does not support peer-to-peer connections (Block 804), the remote access server 128 may return a service denial message to the mobile client 104 (Block 806). The remote access server 128 may send a peer-to-peer connection query to the remote client 108 (Block 808). The remote access server 128 may receive a set of remote client data from the remote client 108, such as an internet protocol address and peer-to-peer capability (Block 810). If the remote client 108 does not support peer-to-peer connections (Block 812), the remote access server 128 may return a service denial message to the mobile client 104 (Block 806). The remote access server 128 may wrap the peer-to-peer connection query in the peer-to-peer connection data for the remote client 108 (Block 814). The remote access server 128 may send the peer-to-peer connection data to the mobile client 104 (Block 816).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
sending a peer-to-peer connection query from a mobile client executing on a mobile device specifying a remote client executing on a remote computer device;
receiving in the mobile client connection data for the remote client from a remote access server;
establishing a peer-to-peer connection between the mobile client and the remote client over a data network with the mobile client and the remote client having an equal status and privilege in the peer-to-peer connection;
executing at least one of a delete action, a move action, and a remote copy action on the remote computer device by the mobile device over the peer-to-peer connection;
creating a mobile copy of a remote file on the remote computer device resized based on a mobile device specification for the mobile device;
synchronizing the remote file on the remote computer device with the mobile copy; and
performing a conflict resolution action between the remote file and the mobile copy.

2. The method of claim 1, further comprising:
executing an edit action on the remote file of the remote computer device using the mobile client.

3. The method of claim 1, further comprising:
streaming a remote sequential media file on the remote computer device to the mobile client.

4. The method of claim 1, further comprising:
sending the mobile device specification from the mobile device to the remote client.

5. The method of claim 1, further comprising:
executing a create action on the remote file of the remote computer device using the mobile client.

6. The method of claim 1, further comprising:
creating a synchronization schedule between the mobile client and the remote client.

7. The method of claim 1, further comprising:
creating a mobile file on the mobile device.

8. The method of claim 1 wherein the peer-to-peer connection query is wrapped in peer-to-peer connection data.

9. The method of claim 1, further comprising:
factoring a user input into the conflict resolution action.

10. The method of claim 1, further comprising:
pushing a mobile file to the remote client.

11. The method of claim 1, further comprising:
authenticating the mobile client to the remote client.

12. A tangible machine-readable storage device having a set of instructions detailing a method stored thereon that when executed by one or more processors cause the one or more processors to perform the method, the method comprising:
receiving in a remote client on a remote computer device a peer-to-peer connection query specifying the remote client from a remote access server on behalf of a mobile client executing on a mobile device;
establishing a peer-to-peer connection between the remote client and the mobile client over a data network with the mobile client and the remote client having an equal status and privilege in the peer-to-peer connection;
executing at least one of a delete action, a move action, and a remote copy action on a mobile file on the mobile device by the remote computer device over the peer-to-peer connection;
determining a mobile device specification for the mobile device;
creating a mobile copy of a remote file on the remote client for presentation by the mobile client;
resizing the mobile copy based on the mobile device specification;
synchronizing the remote file on the remote computer device with the mobile copy; and
performing a conflict resolution action between the remote file and the mobile copy.

13. The tangible machine-readable storage device of claim 12, wherein the method further comprises:
sending the mobile copy to the mobile device for presentation by the mobile client.

14. The tangible machine-readable storage device of claim 12, wherein the method further comprises:
receiving the mobile device specification from the mobile device.

15. The tangible machine-readable storage device of claim 12, wherein the method further comprises:
determining a permission level for the mobile device.

16. The tangible machine-readable storage device of claim 12, wherein the method further comprises:
receiving the mobile file from the mobile client.

17. The tangible machine-readable storage device of claim 12, wherein the method further comprises:
receiving from the mobile client a designation of other devices as permitted access to the remote client.

18. The tangible machine-readable storage device of claim 12, wherein the method further comprises:
authenticating the mobile client for the remote client.

19. A mobile device, comprising:
memory configured to store a mobile client;
a processor configured to execute the mobile client to:
send, via a network interface a peer-to-peer connection query specifying a remote client executing on a remote computer device;
receive connection data for the remote client from a remote access server;
establish a peer-to-peer connection with the remote client over a data network with the mobile client and the remote client having an equal status and privilege in the peer-to-peer connection;
execute at least one of a delete action, a move action, and a remote copy action on the remote computer device over the peer-to-peer connection;
create a mobile copy of a remote file on the remote computer device resized based on a mobile device specification for the mobile device;
synchronizing the remote file on the remote computer device with the mobile copy; and
performing a conflict resolution action between the remote file and the mobile copy.

20. The mobile device of claim 19, wherein the network interface is further configured to send the mobile device specification from the mobile device to the remote client.

* * * * *